United States Patent [19]

Pinto et al.

[11] Patent Number: 4,661,366

[45] Date of Patent: Apr. 28, 1987

[54] METHOD TO MAKE ICING USING A CONTROLLED MULTI-ZONE COOLING AND MIXING MACHINE

[75] Inventors: Albert A. Pinto, White Plains, N.Y.; Clemence K. Dartey, Oakland, N.J.

[73] Assignee: Nabisco Brands, Inc., Parsippany, N.J.

[21] Appl. No.: 757,306

[22] Filed: Jul. 22, 1985

[51] Int. Cl.⁴ .................... A23G 3/00; A23G 3/14
[52] U.S. Cl. ............................ 426/572; 426/659; 426/613; 62/342
[58] Field of Search ............ 426/572, 659, 606, 613; 62/342

[56] References Cited

U.S. PATENT DOCUMENTS

| | | | |
|---|---|---|---|
| 2,507,477 | 5/1950 | MacDonald et al. | 426/659 |
| 2,915,023 | 12/1959 | Rapaport | 426/659 |
| 3,520,698 | 7/1970 | Katz et al. | 426/572 |
| 3,526,517 | 9/1970 | Shaffer et al. | 426/659 |
| 3,914,453 | 10/1975 | Gawrilow | 426/572 |
| 3,962,473 | 8/1976 | Lilov | 426/572 |
| 4,468,409 | 8/1984 | Metzroth | 426/659 |

*Primary Examiner*—Jeanette Hunter
*Attorney, Agent, or Firm*—Richard Kornutik

[57] ABSTRACT

The present invention is a process for making icing utilizing a modified chocolate mixing machine. An icing slurry made of a mixture of fat and sugar is prepared and pumped into the mixing machine. The mixing machine has a plurality of independently controlled temperature zones. The icing slurry is mixed and propelled through these temperature zones by a plurality of blades attached to a rotor. The mixing machine has cooling plates between the blades. The cooling plates congeal the icing as it is being mixed. The icing is also aerated during this process. This process produces an icing having small beta prime fat crystals which allow the icing to "set-up" rapidly. This invention also includes the product of the process.

3 Claims, 2 Drawing Figures

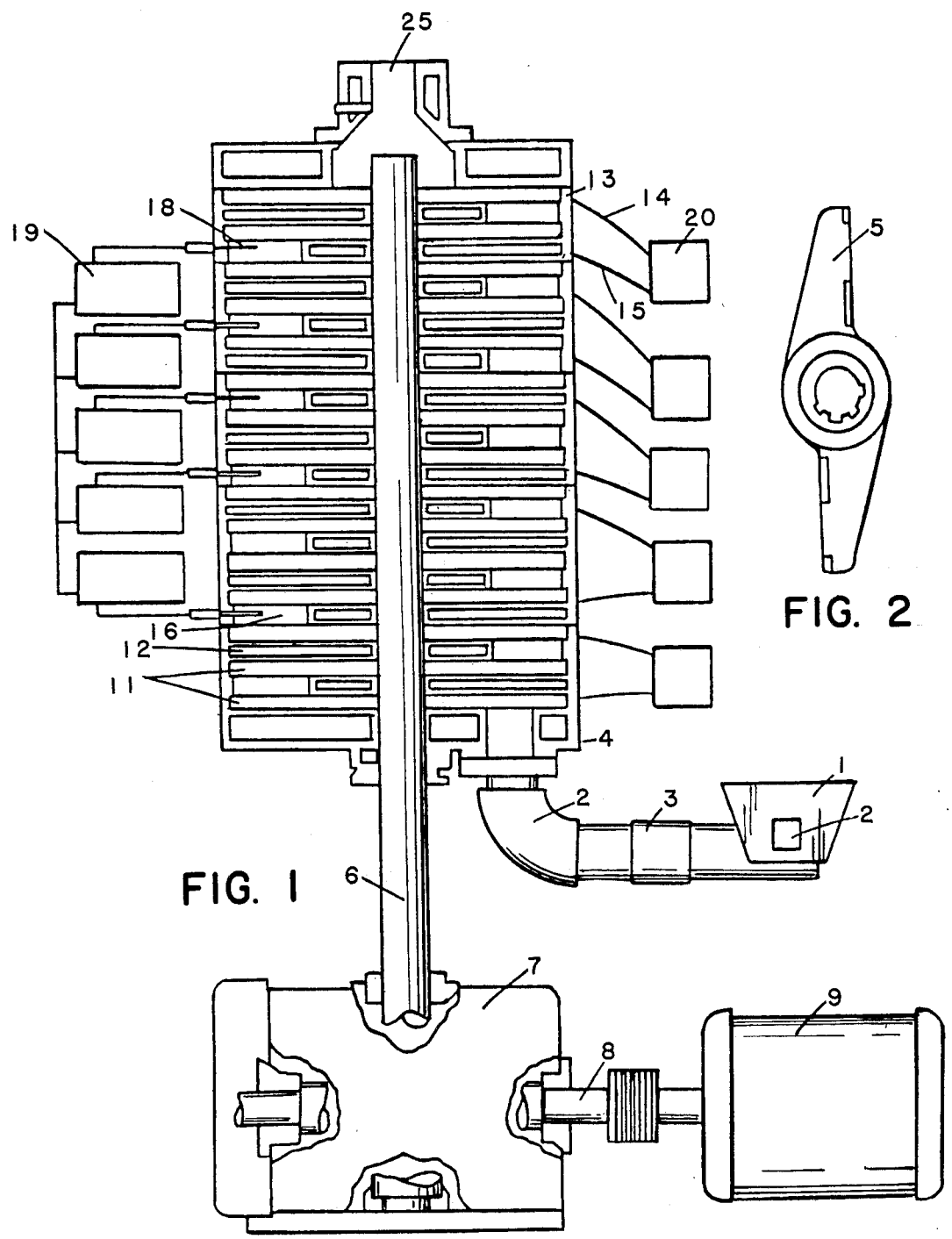

METHOD TO MAKE ICING USING A CONTROLLED MULTI-ZONE COOLING AND MIXING MACHINE

BACKGROUND OF THE INVENTION

1. Field of the Invention

This invention relates to a method for making icing. In particular, this invention relates to a method for making icing on an industrial scale which uses a mixing machine having a plurality of independently controlled temperature zones.

2. Description of the Prior Art

Methods for making confectionery cream substances such as chocolate, frosting, icing, and fudges are well known in the art. Chocolates can be made by using a cylinder-like machine that forces a sugary mass through a series of cooling stages. Each stage usually contains blades revolving about an axis. The blades continuously scrape the chocolate mass from the cooling surfaces of the mixing machine. These chocolate mixing machines are designed to condition the chocolate mass by homogenizing and cooling the chocolate mass to an acceptable state for further processing.

Similar conditioning is required for producing an icing, but a chocolate mixing machine is not considered suitable for producing icing. An icing slurry is more abrasive than a chocolate mass and rapidly deteriorates the blades of chocolate mixing machines. An icing slurry also has a higher viscosity than a chocolate mass. The viscosity of an icing slurry requires a more powerful motor to turn the blades of an icing mixing machine than is required for a chocolate mixing machine in processing a chocolate mass.

Icing mixing machines used for making icing on an industrial scale for sandwich cookies or pastry filling usually have mixing chambers surrounded by an externally cooled cylinder. The external cooling of the cylinder is provided by pumping a chilled fluid such as a fluorinated hydrocarbon or water through a jacket placed about the cylinder. Within the mixing chamber of the cylinder, blades are mounted on a rotor which is driven by a motor. In operation the icing slurry is pumped into the entrance of the icing mixing machine. The rotation of the blades mixes and propels the icing slurry through the cylinder. The icing is also aerated and cooled as it passes through the cylinder of the icing mixing machine. The cooling of the icing slurry is regulated within the cylinder by monitoring the exit temperature of the icing. If the exit temperature of the icing is too high or too low for proper crystaline formation, the input temperature of the chilled fluid to the cooling jacket of the cylinder is appropriately adjusted to obtain the desired exit temperature for the icing. Icing mixing machines, according to this description, are sold under the name Votator by the Anco Votator Division, Cherry Burrell Corporation, Louisville, Ky. Votator machines do not permit the temperature within the mixing cylinder to be controlled in distinct stages as the icing is being formed. Without distinct multiple stages of control of the temperature within the cylinder, variations in the crystallization and the specific gravity of the icing occur as the icing is being formed. These variations respectively cause changes in the quality or "mouth feel" of the icing and the amount of icing which must be applied to a food product to obtain a specified weight.

Variations of the specific gravity of an icing determine the "tolerance" at which the icing can be injected onto food stuffs. If the variation in the specific gravity of an icing is significant, more icing must be applied to each cookie or pastry to ensure that those cookies or pastries, which receive icing with a low specific gravity, receive a sufficient volume of icing to meet a minimum weight standard. A significant variation in specific gravity is generally ±0.05 or more in the icing being produced. An icing mixing machine that can produce an icing at a consistent specific gravity decreases the tolerance or amount of overfilling of icing onto food stuffs. With a decreased variation in the weight per unit volume of icing produced, less food stuffs are overfilled. When less overfilling of food stuffs is required, a significant economic benefit can be realized by a commercial scale bakery.

Fat crystals that are formed in an icing exist in a number of separate and distinct crystalline phases. The designation of these crystalline structures are alpha crystals, beta prime crystals, intermediate crystals, and beta crystals. The alpha crystalline structure is the least stable crystalline phase. These crystals are loosely packed and do not lend themselves to aeration. The intermediate and beta crystals are more stable during aeration than alpha or beta prime crystals. This additional stability is due to the closely packed structure of these crystals. These crystals are comparatively large and entrap larger air bubbles than the alpha or beta prime crystals. By entrapping larger air bubbles, a less stable icing is produced which results in a product having poor storage characteristics.

The desired crystalline structure to be obtained in an icing is the beta prime crystalline structure. The beta prime crystalline structure of a fat enhances the aeration qualities of the icing being produced. Beta prime fat crystals have a small size of approximately 1 micron which results in a crystal lattice structure that enables large quantities of very small air bubbles to be entrapped in the icing. A large amount of very small air bubbles in an icing produces a product having a very desirable mouth feel. The beta prime fat crystalline structure can be produced in an icing by carefully controlling the cooling of an icing as it is being mixed and aerated.

U.S. Pat. No. 3,914,453 to Gawrilow discloses a process for preparing bakery products. This patent uses a multi-purpose shortening to produce a variety of baked products including fillings. This patent discusses the importance of beta prime crystal structures for fats used in bakery goods. This patent does not disclose a method for making an icing with a consistent specific gravity.

U.S. Pat. No. 2,677,942 to Schott et al. discloses a cooling machine for oleaginous substances. This machine has chambers wherein scrapers mix the oleaginous substance and pass it through the apparatus. Between each scraper are thin walled containers which hold a cooling medium or fluid. The flow rate of the oleaginous composition through the machine is controlled. This machine provides a large cooling surface for contact with the oleaginous substances as it is being mixed. This machine does not have controlled temperature zones between each stage.

U.S. Pat. No. 4,059,047 to Sollich discloses a conditioning machine for chocolate masses. This machine also has blades or scrapers which mix and propel the chocolate mass through the apparatus. These scrapers are in chambers separated by cooling surfaces. This apparatus provides a large cooling surface for the chocolate mass as it is passed through the machine. The cooling zones cannot be individually controlled.

U.S. Pat. No. 2,507,477 to MacDonald et al. discloses a system for preparing a confectionery cream. This apparatus moves a cream through a cylindrical chamber with blades or paddles. There are no individually controlled cooling elements between these blades or paddles. The cooling in this apparatus is provided by pumping a chilled liquid through the external wall of the chamber.

U.S. Pat. No. 3,962,473 to Lilov discloses a staged cooling apparatus for making crust liqueurs for chocolates. The liqueurs which are cooled pass through a drum that has an external cooling jacket. Within the drum is a rotatable shaft on which scrapers are mounted. Controlled multi-stage cooling can be achieved by operating a number of these devices connected in a series by tubes. This method does not use an apparatus having a single cylinder containing all the mixing blades and cooling plates.

U.S. Pat. No. 4,104,412 to Fischer et al. discloses a system for making aerated candy. A candy composition passes through an apparatus that has a rotor with arms that are rotated in chambers. Controlled multi-stage cooling of the candy composition is not achieved with this apparatus.

The industry is lacking a method for making icing that provides controlled multi-stage cooling of an icing slurry as the slurry is mixed and aerated. The method of this invention makes an icing by employing an apparatus that provides a controlled temperature reduction of an icing slurry in stages. This process enhances the formation of desirable small beta prime fat crystals in a high sugar icing composition. This controlled crystal formation allows the icing to "set-up" or solidify rapidly. An abundance of small beta-prime crystals enables the icing to entrap air bubbles and produce a desirable mouth feel. The controlled multi-stage cooling of the method of this invention provides continuous production of an icing having a consistent specific gravity.

BRIEF DESCRIPTION OF THE DRAWINGS

FIG. 1 is a plan view of a mixing apparatus suitable for use with the invented method.

FIG. 2 is a plan view of a scraper blade used with the apparatus of FIG. 1.

SUMMARY OF THE INVENTION

This invention includes a method comprising the following steps. The first step involves mixing, aerating, and propelling an icing slurry simultaneously through a mixing machine having a plurality of independently controlled temperature zones whereby the temperature zones are independently controlled to congeal the icing slurry into an icing having a high concentration of beta prime fat crystals.

This invention includes a method for making icing which uses a means for congealing that is a modified commercial chocolate mixing machine having a plurality of selectively controlled temperature or cooling zones. In this method an icing slurry is prepared from sugar and fat or other suitable ingredients. The icing slurry is pumped into the inlet of the modified chocolate mixing machine and mixed by scraper blades which propel the icing slurry composition through the cylinder-like apparatus. In the preferred embodiment the apparatus is divided into five cooling zones. These cooling zones are formed by cooling plates located between means for simultaneously mixing and propelling an icing slurry such as scraper blades. The cooling plates control the temperature of the icing slurry as the icing slurry is mixed by the scraper blades. The temperature at each cooling plate can be selectively controlled or adjusted. As the icing slurry is mixed and propelled through the apparatus the slurry is aerated and cooled in stages from approximately 130° F. to approximately 70° F. The multi-stage cooling of the icing slurry forms an icing having a predominance of beta prime fat crystals which allow the icing to "set-up" or solidify rapidly.

The icing slurry is about two-thirds sugar and about one-third fat. The icing slurry is pumped into the mixing machine at a temperature between about 110° F. and about 130° F. and at a pressure between about 80 psi and about 90 psi. The five independently controlled temperature zones of the preferred apparatus are set at 115° F., 115° F., 82° F., 76° F., and 76° F. respectively. The invention also includes the product of the process.

DETAILED DESCRIPTION OF THE INVENTION

The present invention is a process for making icing using a mixing machine that is a modified chocolate mixing machine having a plurality of controlled temperature zones. The icing is prepared from sugar and fat and made into an icing slurry. The icing slurry is pumped into the mixing machine. The temperature zones are formed by cooling plates which are located between scraper blades that are mounted on a spindle or rotor. The scraper blades rotate and simultaneously mix and propel the icing slurry through the temperature zones of the mixing machine. The temperature zones are selectively controlled to cool the icing slurry at distinct temperatures. The icing slurry is aerated as it is mixed and propelled through the mixing machine. The preferred embodiment of the mixing machine is a cylinder-like apparatus having a plurality of alternating blade chambers and cooling plates. The cooling plates have passageways through which the icing slurry is propelled into the next chamber. The blade chambers and cooling plates passageways are connected in an alternating series to form a continuous path from the inlet to the outlet of the mixing machine. Within the cooling plates are coolant chambers wherein a liquid coolant is circulated. The temperature of the coolant is selectively controlled to regulate the temperature of each cooling zone. Within the passageways between the blade chambers there are aeration nozzles which supply pressurized, food grade, clean air into the icing slurry. The blades are turned by the rotor at about 10 revolutions per minute. The rotor is connected through a reduction gear to a motor that operates at about 1700 revolutions per minute. The mixing machine used in the preferred embodiment of the invented method is commercially available without modifications from the Aasted Company of Denmark. The method of this invention is not limited to a particular mixing machine with multi-stage cooling zones. Any mixing machine with a plurality of individually controlled cooling zones can be used to perform the invented method, provided that the mixing machine is sufficiently strong enough to "whip" or mix a viscous icing slurry.

In the preferred embodiment of the method of this invention an apparatus as illustrated in FIG. 1 is used. The icing slurry is prepared in a mixer (not shown) by blending a suitable granulated sugar and suitable fat in about a 2 to 1 ratio, respectively. A suitable sugar can be between a 6X and 10X granulation. Suitable fats can include soybean oil, palm kernel oil, coconut oil, and other oils as well as mixtures of oils. Other ingredients including flavorings can also be mixed into the icing slurry.

The method of this invention is not limited to specific icing slurry formulas or ingredients. The sugar and fat are blended at a temperature between about 110° F. and about 130° F. The sugar and fat blend are fed to a hopper 1. The hopper 1 can be optionally heated to maintain the icing slurry at a desired temperature. The icing slurry in the hopper 1 is a suspension of insoluble sugar and fats having a thick, viscous consistency. An optional mixer 24 within the hopper 1 can be useful in maintaining the suspension.

The icing slurry is transported from the hopper 1 to an inlet pipe 2 by a pump 3. The pump 3 used in the preferred embodiment is a Moyno ® pump manufactured by the Robins & Myers Corporation of Springfield, Ohio. Mayno ® pumps have variable drive sugar-like worm screws. These pumps can be regulated to control the rate of feed of the icing slurry to the mixing machine. Any pump which can pump an icing slurry at a pressure between about 80 psi to about 90 psi is suitable for use with this invention. The inlet pipe 2 is a cylindrical tube attached to an opening into the mixing machine. The inlet pipe 2 is connected to an opening at the bottom of a cylinder housing 4.

The icing slurry, once it is inside the cylinder housing 4, comes in contact with scraper blades. The scraper blades (not shown in FIG. 1) in the preferred embodiment all have a structure as illustrated in FIG. 2 for a scraper blade 5. The scraper blades of the mixing machine are desirably reinforced to withstand the viscosity and abrasiveness of the icing slurry. The scraper blades are mounted on a spindle or rotor 6. The rotor 6 is driven through a gear box 7 which inturn is connected to a motor shaft 8. A reinforced motor shaft and gear box assembly are required to operate the mixing machine used in the preferred embodiment of the invented method. This is because of the greater viscosity of an icing slurry as compared to a chocolate mass. This entire assembly is driven by a motor 9.

The motor 9 can be any conventional motor such as an electric motor that can rotate the attached assembly including the mixing machine sufficiently to mix and propel the icing slurry. The preferred embodiment of the motor used in this invention is more powerful than the motors used to make chocolate. A more powerful motor is required in order to mix a viscous icing slurry. The motor used in this embodiment operates at about 1700 revolutions per minute. The gear box 7 contains reduction gears (not shown). The reduction gears transform the rotation of the motor shaft 8 to about 10 revolutions per minute for the rotation of the rotor 6.

The scraper blades are not depicted in FIG. 1 so as to better illustrate the elements of the mixing machine. The scraper blades turn freely within blade chambers 11. The scraper blades have two extending arms with angled surfaces to propel the icing slurry as the scraper blades rotate. These arms scrape the icing slurry from the surface of the blade chambers 11. The surface of the blade chambers 11 are formed by adjacent means for congealing or cooling plates 12.

A liquid coolant is pumped into coolant inputs 14 and is circulated through the hollow coolant chambers 13. The coolant exits through a coolant outputs 15. The coolant can be any suitable coolant known in the art including a glycol and water mixture.

The scraper blades scrape off and remove the icing slurry from the blade chambers 11. The scraper blades propels the icing slurry through passageways 16. The passageways 16 connect the blade chambers 11 with one another. The scraper blades propel the icing slurry by forcing the icing slurry through a passageway into the next blade chamber. The blade chambers 11 are connected to the passageways 16 so as to form a continuous pathway from the inlet pipe 2 to the outlet 25. The passageways 16 are located on alternate sides of the cylinder housing 4. The icing slurry is continuously forced through the blade chambers 11 and passageways 16 of the mixing machine until the icing slurry congeals and exits the mixing machine through the outlet 25.

In the mixing machine used in the preferred embodiment of the invention aeration nozzles 18 are located in at least one of the passageways 16. The aeration nozzles 18 inject food grade clean, compressed air into the icing slurry. The standard for food grade clean air is established by the Food and Drug Administration. The compressed air is injected through the aeration nozzles 18 into the icing slurry as the icing slurry is being mixed and propelled through the mixing machine. An accurate means for aerating or aeration regulators 19 can be selectively adjusted to inject a desired amount of air into the icing slurry. Variations in the amount of air injected into the icing slurry affect the specific gravity of the resulting icing. Variations in the specific gravity of an icing effect the "mouth feel" of the icing and the weight per unit of volume of the icing. The means for aerating must be sufficiently accurate to prevent fluctuations in the specific gravity of the icing.

The flow of coolant is regulated by a temperature regulator 20. In the mixing machine used in the preferred embodiment of the invention the temperature regulators 20 control five distinct temperature or cooling zones. The five cooling zones can be independently regulated to change the temperature of the icing slurry in each cooling zone. Desirable temperatures for the operation of the mixing machine are from an initial temperature of about 120° F. to an exit temperature of about 70° F. In the preferred embodiment of the invention the first cooling zone is 115° F., the second cooling zone is 115° F., the third cooling zone is 82° F., the fourth cooling zone is 76° F., and the fifth cooling zone is 76° F. These temperature settings and operating conditions produce actual temperatures in the first cooling zone of about 110° F., the second cooling zone of about 100° F., the third cooling zone of about 87° F., the fourth cooling zone of about 84° F., and the fifth cooling zone of about 86° F. This variation in temperature zones enhances the formations of beta prime fat crystals.

Thermometers or other temperature monitoring sensors (not shown) are located within the cooling zones. The thermometers measure the actual temperature of the icing slurry as it is mixed and propelled through each cooling zone. The actual temperature of the icing slurry is provided as feed back data to the temperature reguators 20. The temperature regulators 20 automatically regulate the amount of coolant to their respective cooling zones. In this manner the temperature of each cooling zone is maintained and is individually responsive to changes in the temperature of the icing slurry entering that cooling zone.

The use of a mixing machine with sequential, independently controlled cooling zones to congeal an icing slurry enhances the formation of beta prime fat crystals. Beta prime fat crystals produce icing that "sets-up" or solidifies rapidly. An icing having predominantly beta prime fat crystals has a good mouth feel and a desirable eating consistency. The use of a mixing machine with sequential, independently controlled cooling zones allows icing to be produced continuously on a production line of a commercial bakery. The icing that is produced has a is consistent specific gravity and, thereby, is of a consistent weight per unit of volume of icing.

The production according to the preferred embodiment to this invention of icing having a consistent specific gravity can save approximately $250,000 per year in an average commercial bakery for producing sandwich cookies. This savings results from a decreased requirement for overfilling the cookies. This amount is based upon a rate of production of 8400 pounds per hour of sandwich cookies that are filled with an icing. The icing is formed in a 2 to 1 ratio of 6X sugar to soybean oil.

The following examples illustrate the process of the present invention and the advantages derived from utilizing a controlled, multi-temperature zone mixing machine to make icing.

EXAMPLE 1

This Example represents the preferred embodiment of the present invention for producing an icing. An icing slurry is continuously prepared by mixing batches of about 63% sugar (6X) and 34% soybean oil in a ribbon blender or mixer. The icing slurry is blended for 15 minutes and is simultaneously heated to a temperature of 115° F. The icing slurry is then transferred to a hopper. The hopper feeds a Moyno ® pump which has a variable drive auger-like worm screw and provides a selectively regulated rate of feed of the prepared icing slurry to the mixing machine. The Moyno ® pump supplies the icing slurry at a pressure of 90 psi to the inlet of the mixing machine. The mixing machine used in this Example is a chocolate mixing machine known as an Aasted auto-temperer produced in Denmark. This machine is modified for making icing. The scraper blades, motor shafts, and gear box are reinforced to ensure suitable mixing of an icing slurry. The motor is more powerful than that used to a mix chocolate mass. As the icing slurry enters the mixing apparatus it fills the first blade chamber. The scraper blade removes the icing slurry from the cooling plate in the blade chamber, mixes the icing slurry, and propels the icing slurry into the next blade chamber. The revolutions of the electric motor are reduced from 1700 revolutions per minute by the gears so as to rotate the rotor and scraper blades at 10 revolutions per minute. The icing slurry is simultaneously cooled in stages as it is scraped, mixed, and propelled through the mixing machine. The mixing machine is equipped with five temperature regulators to independently control five cooling zones of the mixing machine. Each cooling zone is equipped with a thermocouple to measure the actual temperature of the icing slurry within a cooling zone and provide that data as feed back to the temperature regulator. An aeration regulator is adjusted to inject FDA standard food grade, compressed air into each of the five cooling zones. The temperature settings and actual temperature recordings of each of the five cooling zones are identified in Table 1.

TABLE 1

| Temperature Regulator Setting | Actual Temperature Recordings |
|---|---|
| Zone 1 115° F. | 110 |
| Zone 2 115° F. | 100 |
| Zone 3 82° F. | 87 |
| Zone 4 76° F. | 84 |
| Zone 5 76° F. | 86 |

As the icing slurry passes from one cooling zone to the next the icing slurry is cooled and congealed into icing.

This process produces icing with a predominance of beta prime fat crystals. This method and these operating parameters provide continuous making and feeding of icing to a sandwich cookie production line.

EXAMPLES 2 AND 3

The procedure to produce the icings of these Examples is the same as that used in Example 1. Table 2 identifies the temperature regulator settings and actual temperature recordings of each of the five zones.

TABLE 2

| Temperature Regulator Setting | Actual Temperature Recordings | |
|---|---|---|
| | Example 2 | Example 3 |
| Zone 1 115° F. | 112 | 111 |
| Zone 2 115° F. | 99 | 101 |
| Zone 3 82° F. | 84 | 88 |
| Zone 4 76° F. | 81 | 83 |
| Zone 5 76° F. | 84 | 86 |

The icings of these Examples also have a predominance of beta prime crystals.

EXAMPLE 4

The procedure used to produce the icing of this Example is the same as used in Example 1 except that the icing slurry is mixed at a temperature of 130° F. and then pumped into the mixing machine at a pressure of 80 psi. The temperature of each temperature zone is identified in the Table 3.

TABLE 3

| Temperature Regulator Setting |
|---|
| Zone 1 130° F. |
| Zone 2 110° F. |
| Zone 3 90° F. |
| Zone 4 80° F. |
| Zone 5 70° F. |

The icing resulting from this Example would have enhanced beta prime fat crystal formation.

What is claimed:
1. The process for making icing comprising:
   (a) preparing an icing slurry, said icing slurry being about 63% sugar 6X and about 34% soybean oil;
   (b) pumping said icing slurry at a pressure between about 80 psi and about 90 psi into a means for congealing said icing slurry; and
   (c) forming an icing from said icing slurry by said means for congealing, said means for congealing having:
      (i) a plurality of independently controlled temperature zones, said plurality of said independently controlled temperature zones being 5 zones, said 5 zones being set a sequential temperatures of 115° F., 115° F., 82° F., 76° F., and 76° F.;

(ii) a means for simultaneously mixing and propelling said icing slurry through said temperature zones; and (iii) a means for aerating said icing slurry during said mixing and propelling, whereby said icing slurry is aerated and congealed into an icing having a predominance of beta prime crystals.

2. A process for making icing according to claim 1, wherein said means for congealing is a multi-temperature zone chocolate mixing machine.

3. A process for making icing according to claim 2, wherein said multi-temperature zone chocolate mixing machine is an Aasted auto-tempered chocolate mixing machine operated at about 10 revolutions per minute.

* * * * *